(12) United States Patent
Santele

(10) Patent No.: US 11,540,665 B1
(45) Date of Patent: Jan. 3, 2023

(54) FIRE PIT COOKING SYSTEM

(71) Applicant: Christopher Santele, Mora, MN (US)

(72) Inventor: Christopher Santele, Mora, MN (US)

( * ) Notice: Subject to any disclaimer, the term of this patent is extended or adjusted under 35 U.S.C. 154(b) by 457 days.

(21) Appl. No.: 16/800,020

(22) Filed: Feb. 25, 2020

(51) Int. Cl.
A47J 33/00 (2006.01)
A47J 37/04 (2006.01)

(52) U.S. Cl.
CPC .............. *A47J 33/00* (2013.01); *A47J 37/049* (2013.01)

(58) Field of Classification Search
CPC ........ A47J 2037/0795; A47J 2037/0763; A47J 33/00
USPC ............... 99/421 HV; 126/30, 25 A, 29, 9 B
See application file for complete search history.

(56) References Cited

U.S. PATENT DOCUMENTS

| 4,065,085 A | 12/1977 | Gellatly |
| 4,094,296 A | 6/1978 | Beagley |
| 4,320,700 A * | 3/1982 | Stachowicz ......... A47J 37/0786 126/30 |
| 4,513,936 A | 4/1985 | Goulter |
| D344,207 S | 2/1994 | Bauman |
| 5,848,584 A | 12/1998 | Brog |
| 6,029,646 A | 2/2000 | Jackson |
| 6,234,162 B1 | 5/2001 | Wenker |
| 6,584,967 B1 * | 7/2003 | Paumen .................. A47J 33/00 126/30 |
| 2004/0020484 A1 * | 2/2004 | Skidmore ........... A47J 37/0763 126/304 R |

FOREIGN PATENT DOCUMENTS

WO 2006083705 8/2006

* cited by examiner

*Primary Examiner* — Vivek K Shirsat
(74) *Attorney, Agent, or Firm* — Kyle A. Fletcher, Esq.

(57) ABSTRACT

The fire pit cooking system is configured for use with a fire and a foodstuff. The fire pit cooking system suspends the foodstuff above the fire. The fire pit cooking system is adjustable such that the position of the foodstuff relative to the fire is adjustable. The fire pit cooking system comprises a pedestal, a telescopic stanchion, and a jib structure. The telescopic stanchion attaches the jib structure to the pedestal. The telescopic stanchion forms a load path that transfers the load of the jib structure to the pedestal. The pedestal is a structure that forms a load path that transfers the load of the telescopic stanchion and the jib structure to a supporting surface. The jib structure suspends the foodstuff above the fire. The jib structure attaches to the telescopic stanchion such that the elevation of the jib above the supporting surface is adjustable.

19 Claims, 5 Drawing Sheets

FIRE PIT COOKING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of domestic articles including kitchen equipment, more specifically, a roasting apparatus with movably mounted food supports. (A47J37/04)

SUMMARY OF INVENTION

The fire pit cooking system is configured for use with a foodstuff. The fire pit cooking system is configured for use with a fire. The fire pit cooking system suspends the foodstuff above the fire. The fire pit cooking system is adjustable such that the position of the foodstuff relative to the fire is adjustable. The fire pit cooking system comprises a pedestal, a telescopic stanchion, and a jib structure. The telescopic stanchion attaches the jib structure to the pedestal. The telescopic stanchion forms a load path that transfers the load of the jib structure to the pedestal. The pedestal is a structure that forms a load path that transfers the load of the telescopic stanchion and the jib structure to a supporting surface. The jib structure suspends the foodstuff above the fire. The jib structure attaches to the telescopic stanchion such that the elevation of the jib above the supporting surface is adjustable.

These together with additional objects, features and advantages of the fire pit cooking system will be readily apparent to those of ordinary skill in the art upon reading the following detailed description of the presently preferred, but nonetheless illustrative, embodiments when taken in conjunction with the accompanying drawings.

In this respect, before explaining the current embodiments of the fire pit cooking system in detail, it is to be understood that the fire pit cooking system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fire pit cooking system.

It is therefore important that the claims be regarded as including such equivalent construction insofar as they do not depart from the spirit and scope of the fire pit cooking system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
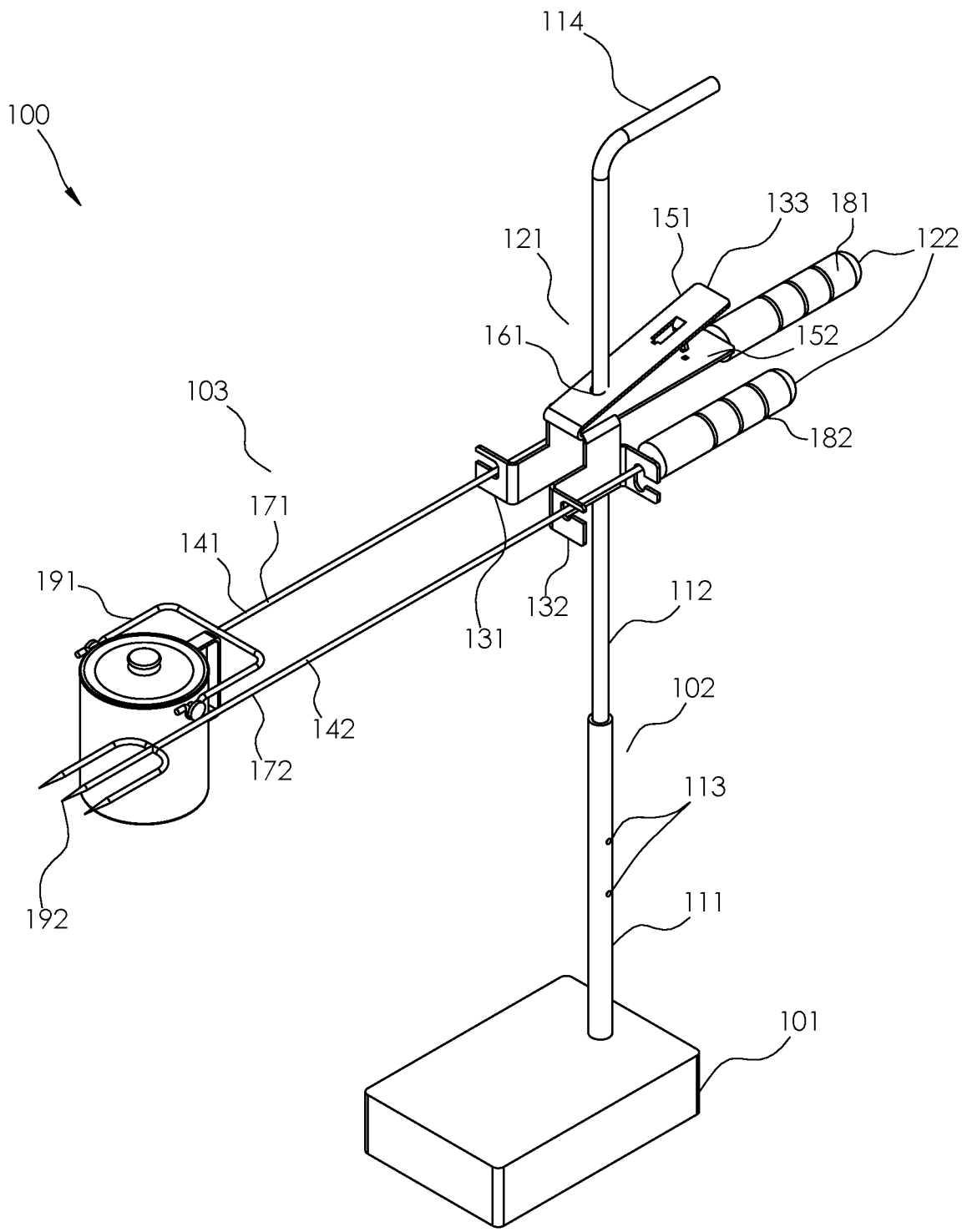
FIG. 1 is a perspective view of an embodiment of the disclosure.
Figure 2:
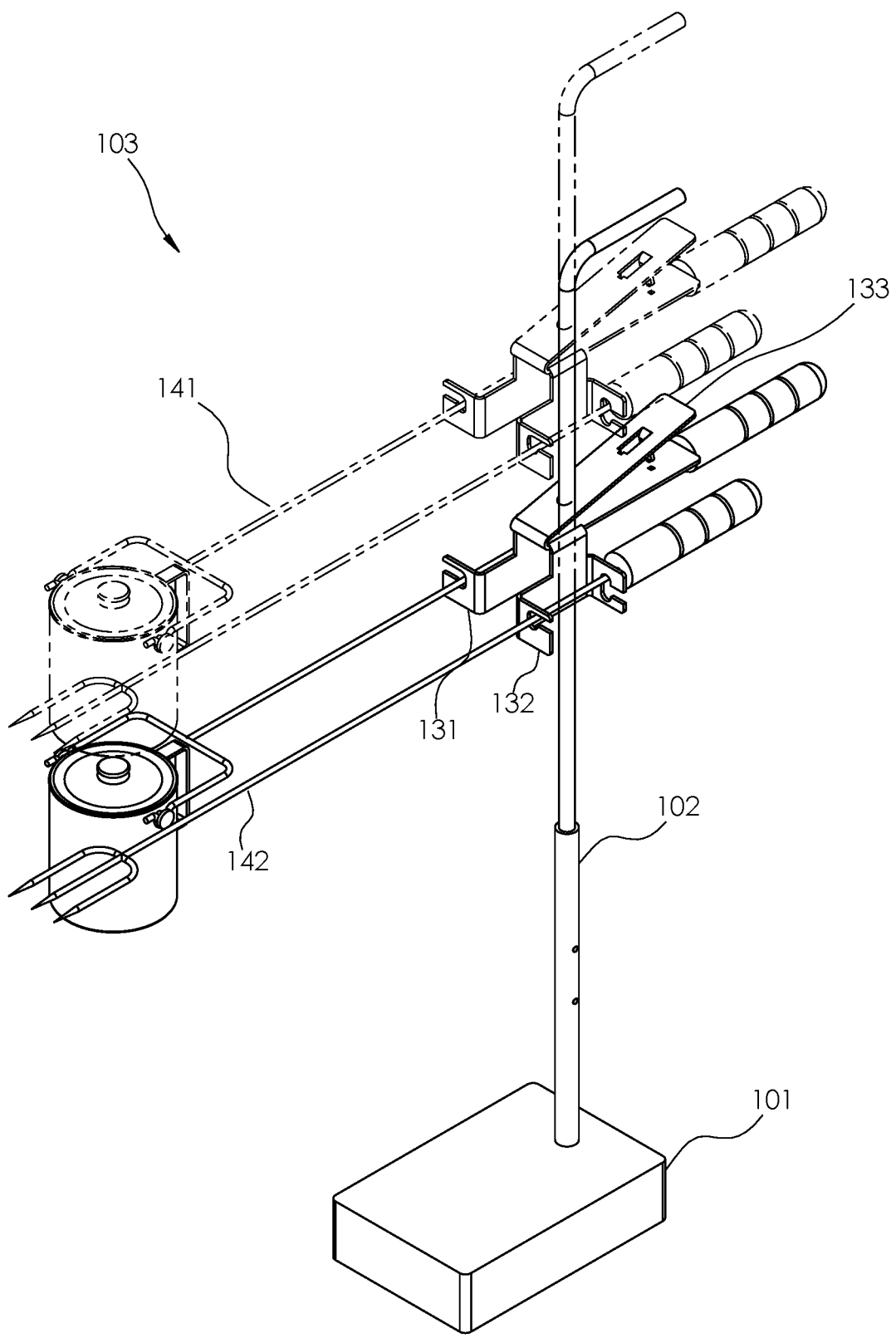
FIG. 2 is an alternate perspective view of an embodiment of the disclosure.
Figure 3:
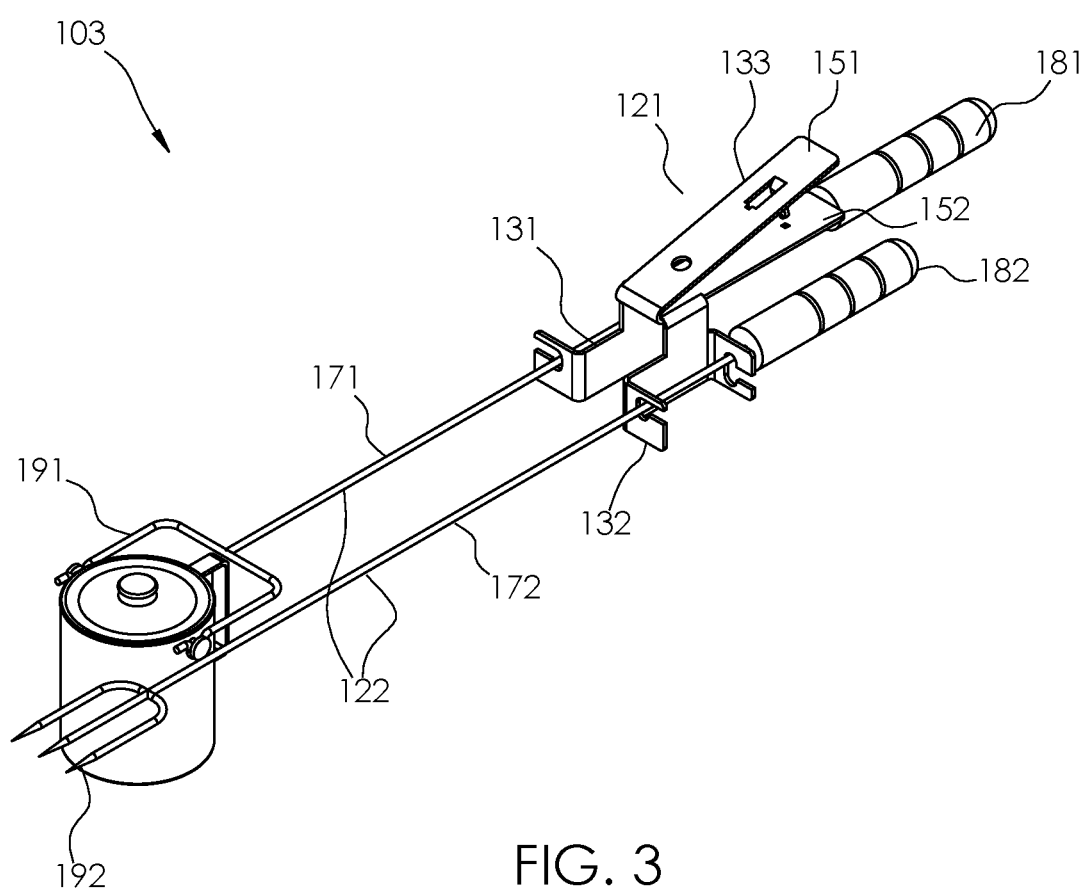
FIG. 3 is a detail view of an embodiment of the disclosure.
Figure 4:
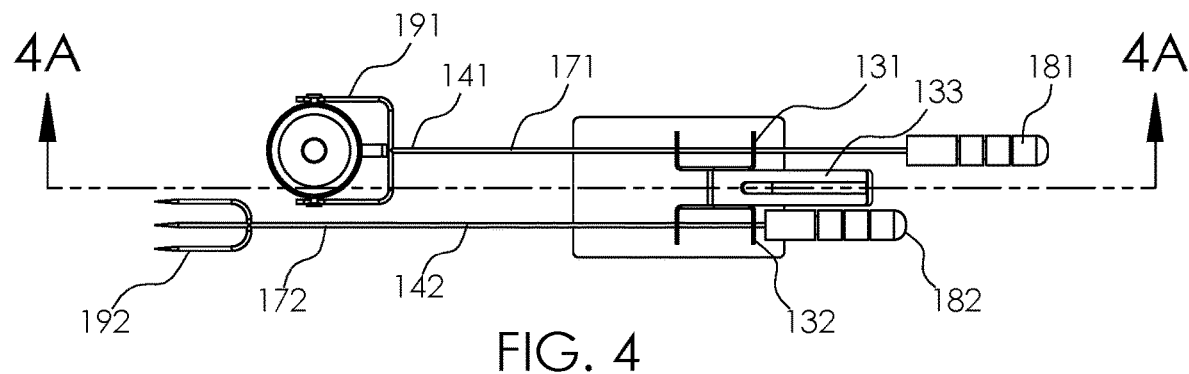
FIG. 4 is a top view of an embodiment of the disclosure.
Figure 4A:
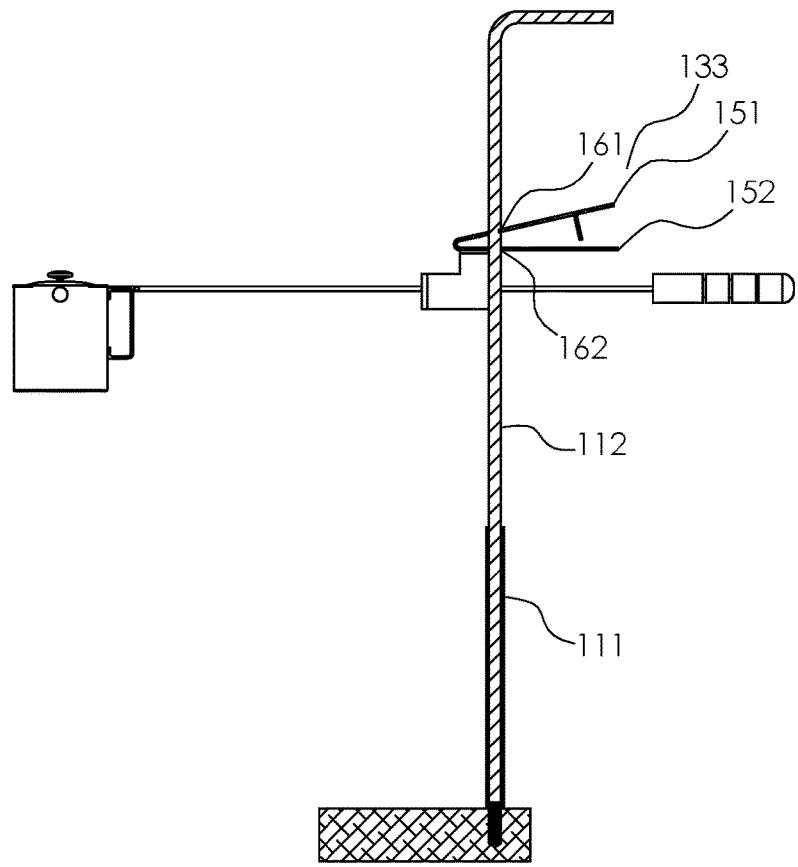
FIG. 4A is a cross-sectional view of an embodiment of the disclosure across 4A—4A as shown in FIG. 4.
Figures 5, 6:
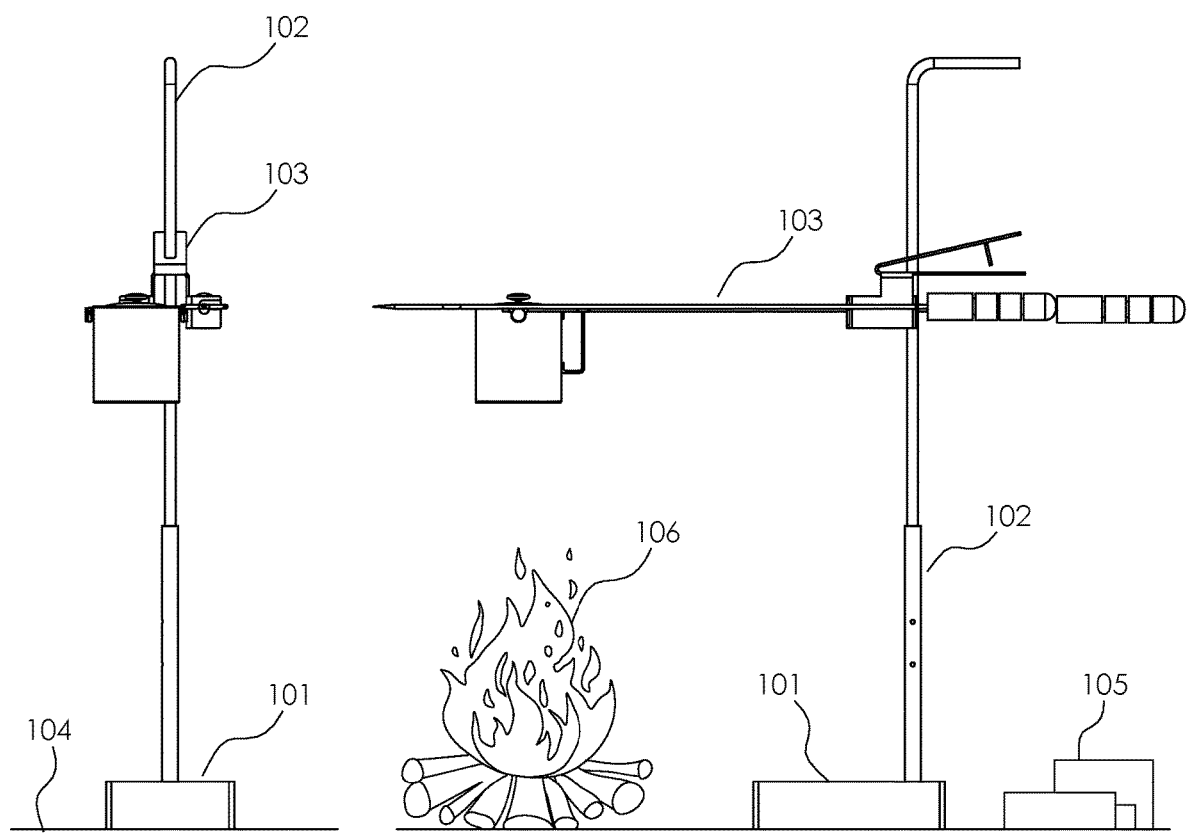
FIG. 5 is a front view of an embodiment of the disclosure.
FIG. 6 is a side view of an embodiment of the disclosure.

Detailed reference will now be made to one or more potential embodiments of the disclosure, which are illustrated in FIGS. 1 through 6.

The fire pit cooking system 100 (hereinafter invention) is configured for use with a foodstuff 105. The invention 100 is configured for use with a fire 106. The invention 100 suspends the foodstuff 105 above the fire 106. The invention 100 is adjustable such that the position of the foodstuff 105 relative to the fire 106 is adjustable. The invention 100 comprises a pedestal 101, a telescopic stanchion 102, and a jib structure 103. The telescopic stanchion 102 attaches the jib structure 103 to the pedestal 101. The telescopic stanchion 102 forms a load path that transfers the load of the jib structure 103 to the pedestal 101. The pedestal 101 is a structure that forms a load path that transfers the load of the telescopic stanchion 102 and the jib structure 103 to a supporting surface 104. The jib structure 103 suspends the foodstuff 105 above the fire 106. The jib structure 103 attaches to the telescopic stanchion 102 such that the elevation of the jib above the supporting surface 104 is adjustable.

The supporting surface 104 is defined elsewhere in this disclosure. The foodstuff 105 is defined elsewhere in this disclosure. The fire 106 is a common term for a well-known chemical reaction called combustion. Combustion is defined elsewhere in this disclosure.

The pedestal 101 is a prism-shaped structure. The pedestal 101 has a disk-shaped structure. The pedestal 101 forms the inferior structure of the invention 100. The pedestal 101 is formed with a high density material such that the invention 100 will maintain a low center of mass relative to the supporting surface 104 during the use of the invention 100. By high density is meant that the pedestal 101 has a density of greater than 7.5 grams per cubic centimeter. The pedestal 101 forms the final link in the load path that transfers the load of the invention 100 to the supporting surface 104.

The telescopic stanchion 102 is a composite prism structure. The telescopic stanchion 102 is a vertically oriented structure. By vertically oriented is meant that the center axis of the composite prism structure of the telescopic stanchion 102 is parallel to the vertical direction. The telescopic stanchion 102 is a telescopic structure such that the span of the length of the center axis of the composite prism structure of the telescopic stanchion 102 is adjustable. The telescopic stanchion 102 attaches to the superior surface of the pedestal 101. The telescopic stanchion 102 attaches to the pedestal 101 such that the center axis of the composite prism structure of the telescopic stanchion 102 projects perpendicularly away from the superior surface of the pedestal 101. The telescopic stanchion 102 comprises a first stanchion arm 111, a second stanchion arm 112, and a detent 113.

The detent 113 is a mechanical structure that locks and secures the first stanchion arm 111 to the second stanchion arm 112. The first stanchion arm 111 is a hollow first prism-shaped structure that is further defined with an inner dimension. The second stanchion arm 112 is a second prism-shaped structure that is further defined with an outer dimension. The second stanchion arm 112 has a non-Euclidean prism structure. The first stanchion arm 111 and the second stanchion arm 112 are geometrically similar.

The span of the outer dimension of the second stanchion arm 112 is less than the span of the inner dimension of the first stanchion arm 111 such that the second stanchion arm 112 inserts into the first stanchion arm 111 in a telescopic manner to form a composite prism structure. The span of the length of the telescopic stanchion 102 adjusts by adjusting the relative position of the second stanchion arm 112 within the first stanchion arm 111. The position of the second stanchion arm 112 relative to the first stanchion arm 111 is held in position using the detent 113. The detent 113 is selected from the group consisting of a cotter pin, a G snap collar, a cam lock collar, a threaded clutch, a split collar lock, or a spring loaded ball lock.

The second stanchion arm 112 further comprises a stanchion grip 114. The stanchion grip 114 is a 90 degree bend that is formed in the end of the second stanchion arm 112 of the telescopic stanchion 102 that is distal from the first stanchion arm 111 of the telescopic stanchion 102. The 90 degree bend is defined elsewhere in this disclosure. The stanchion grip 114 forms a handle that allows an individual to adjust the position of the second stanchion arm 112 within the first stanchion arm 111.

The jib structure 103 is a mechanical structure. The jib structure 103 suspends the foodstuff 105 over the fire 106. The jib structure 103 forms the structure that attaches the foodstuff 105 to the telescopic stanchion 102 of the invention 100. The jib structure 103 attaches to the telescopic stanchion 102 such that the elevation of the jib structure 103 above the supporting surface 104 is adjustable. The adjustment of the elevation of the jib structure 103 adjusts the position of the foodstuff 105 relative to the fire 106. The jib structure 103 comprises a jib clip 121 and a plurality of jibs 122.

The jib clip 121 is a mechanical structure. The jib clip 121 is a spring-loaded structure. The jib clip 121 attaches the plurality of jibs 122 to the telescopic structure 102. The jib clip 121 attaches to the second stanchion arm 112 of the telescopic stanchion 102 such that the position of the jib clip 121 along the center axis of the second stanchion arm 112 is adjustable. The spring-loaded structure of the jib clip 121 clamps the jib structure 103 to the second stanchion arm 112 of the telescopic stanchion 102 into a fixed position. The jib clip 121 moves freely along the center axis of the second stanchion arm 112 when the clamping function of the spring-loaded structure of the jib clip 121 is released. The jib clip 121 comprises a first jib 141 mount 131, a second jib 142 mount 132, and a cantilever v spring 133.

The cantilever v spring 133 is defined elsewhere in this disclosure. The cantilever v spring 133 further comprises a first spring arm 151 and a second spring arm 152. The first spring arm 151 is a disk-shaped structure that forms a first elastomeric element of the cantilever v spring 133. The first spring arm 151 is formed as a semi-rigid structure with an elastic nature. The second spring arm 152 is a disk-shaped structure that forms a second elastomeric element of the cantilever v spring 133. The second spring arm 152 is formed as a semi-rigid structure with an elastic nature. The first spring arm 151 further comprises a first stanchion aperture 161. The second spring arm 152 further comprises a second stanchion aperture 162.

The first stanchion aperture 161 is a disk-shaped negative space that is formed through the congruent ends of the disk structure of the first spring arm 151. The first stanchion aperture 161 is sized such that the second stanchion arm 112 of the telescopic stanchion 102 will insert through the first stanchion aperture 161. The second stanchion aperture 162 is a disk-shaped negative space that is formed through the congruent ends of the disk structure of the second spring arm 152. The second stanchion aperture 162 is sized such that the second stanchion arm 112 of the telescopic stanchion 102 will insert through the second stanchion aperture 162. The position of the second stanchion aperture 162 on the second spring arm 152 relative to the position of the second stanchion aperture 162 on the first spring arm 151 is such that the first spring arm 151 and the second spring arm 152 must be deformed in order to align the center axis of the second stanchion aperture 162 with the center axis of the first stanchion aperture 161.

The cantilever v spring 133 acts as a spring. Specifically, the first spring arm 151 and the second spring arm 152 are deformed when the second stanchion arm 112 simultaneously inserts through the first stanchion aperture 161 of the first spring arm 151 and the second stanchion aperture 162 of the second spring arm 152. As the first spring arm 151 and the second spring arm 152 return to their relaxed shapes, the first stanchion aperture 161 of the first spring arm 151 and the second stanchion aperture 162 of the second spring arm 152 press against the second stanchion arm 112 to lock the jib clip 121 into a fixed position along the center axis of the second stanchion arm 112. By adjusting the position of the jib clip 121 relative to the center axis of the second stanchion arm 112, the position of the foodstuff 105 relative to the fire 106 is adjusted.

The second stanchion arm 112 will only move freely through the first stanchion aperture 161 and the second stanchion aperture 162 when the center axis of the prism structure of the second stanchion arm 112, the center axis of the first stanchion aperture 161, and the center axis of the second stanchion aperture 162 are simultaneously aligned. The first stanchion aperture 161 and the second stanchion aperture 162 will press against the lateral face of the prism structure of the second stanchion arm 112 when the center axes of the first stanchion aperture 161, the second stanchion aperture 162, and the second stanchion arm 112 are out of alignment.

The frictional force applied to the lateral face of the prism structure of the second stanchion arm 112 by the first stanchion aperture 161 and the second stanchion aperture 162 serve to clamp the jib structure 103 at a fixed elevation relative to the supporting surface 104.

The first jib 141 mount 131 is a mechanical structure. The first jib 141 mount 131 attaches to the cantilever v spring 133. The first jib 141 attaches to the first jib 141 mount 131 of the jib structure 103 such that the first jib 141 extends over the fire 106 in the manner of a cantilever. The second jib 142 mount 132 is a mechanical structure. The second jib 142 mount 132 attaches to the cantilever v spring 133. The second jib 142 attaches to the second jib 142 mount 132 of the jib structure 103 such that the second jib 142 extends over the fire 106 in the manner of a cantilever.

Each of the plurality of jibs 122 is a jib. The jib is defined elsewhere in this disclosure. Each of the plurality of jibs 122 attaches to the second stanchion arm 112 of the telescopic stanchion 102 in the manner of a cantilever. Each of the plurality of jibs 122 suspends a foodstuff 105 above the fire 106. Each foodstuff 105 is suspended from the free end of the cantilever structure of a jib selected from the plurality of jibs 122. The plurality of jibs 122 comprises a first jib 141 and a second jib 142.

The first jib 141 is a prism-shaped structure. The first jib 141 attaches to the jib structure 103 such that the first jib 141 projects away from the telescopic stanchion 102 in the manner of a cantilever. The first jib 141 suspends a foodstuff 105 over the fire 106. The first jib 141 further comprises a first jib 141 shaft 171, a first jib 141 handle 181, and a pan mount 191.

The first jib 141 shaft 171 is a prism-shaped structure. The first jib 141 shaft 171 forms an extension structure that creates a reach that separates the pedestal 101 and the telescopic stanchion 102 from the fire 106. The first jib 141 handle 181 is a grip that attaches to the fixed end of the cantilever structure of the first jib 141 shaft 171. The first jib 141 handle 181 allows for the manipulation of the first jib 141 shaft 171 as it attaches to and is removed from the first jib 141 mount 131. The pan mount 191 is a mechanical structure used to attach a cooking pan to the free end of the first jib 141 shaft 171.

The second jib 142 is a prism-shaped structure. The second jib 142 attaches to the jib structure 103 such that the second jib 142 projects away from the telescopic stanchion 102 in the manner of a cantilever. The second jib 142 suspends a foodstuff 105 over the fire 106. The second jib 142 further comprises a second jib 142 shaft 172, a second jib 142 handle 182, and a fork structure 192.

The second jib 142 shaft 172 is a prism-shaped structure. The second jib 142 shaft 172 forms an extension structure that creates a reach that separates the pedestal 101 and the telescopic stanchion 102 from the fire 106. The second jib 142 handle 182 is a grip that attaches to the fixed end of the cantilever structure of the second jib 142 shaft 172. The second jib 142 handle 182 allows for the manipulation of the second jib 142 shaft 172 as it attaches to and is removed from the second jib 142 mount 132. The fork structure 192 is a fork formed on the free end of the second jib 142 shaft 172 that is used to skewer a foodstuff 105 before cooking. The fork and the pan are defined elsewhere in this disclosure.

The following definitions were used in this disclosure:

90 Degree Bend: As used in this disclosure, a 90 degree bend refers to a prism structure with a constant diameter that has a 90 degree cant formed in the center axis of the prism structure at a location between the two congruent ends of the prism structure.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Aperture: As used in this disclosure, an aperture is a prism-shaped negative space that is formed completely through a structure or the surface of a hollow structure.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cantilever V Spring: As used in this disclosure, a cantilever V spring is a torsion spring that is formed in a chevron, hyoid or horseshoe shape. The cantilever V spring comprises a first cantilever structure and a second cantilever structure wherein the fixed end of the first cantilever structure is attached to the fixed end of the second cantilever structure. Within this structure, when a force is applied to the cantilever V spring such that the first cantilever structure moves relative to from the second cantilever structure the force deforms the cantilever V spring in an elastic manner that: 1) resists the application of the force; and 2) stores the energy deformation such that when the force is no longer applied the cantilever V spring returns to its relaxed shape. Depending on the application, a cantilever V spring can be considered a torsion spring, a tension spring, or a compression spring. The term offset cantilever V spring means that the span of the length of the first cantilever structure differs from the span of the length of the second cantilever structure.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Mass: As used in this disclosure, the center of mass refers to a point within a structure wherein a force applied to the point will cause the structure to move without rotation. The center of mass is commonly, but not always, the first moment of the structure normalized by the mass of the structure. While there are technical differences, the center of gravity of an object can be considered a synonym for the center of mass when the object is contained within the atmosphere of the earth.

Chevron: As used in this disclosure, chevron is a term that is used to describe an object that has the shape of a U or a V.

Combustion: As used in this disclosure, combustion refers to a reduction-oxidation reaction wherein oxygen and a hydrocarbon are combined to release energy, carbon dioxide, and water. In general usage, the meaning of combustion is often extended to describe a reaction between oxygen and a fuel source, such as a hydrocarbon modified by functional groups, which releases energy.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

Foodstuff: As used in this disclosure, a foodstuff refers to an edible material that is used as food or a beverage.

Force of Gravity: As used in this disclosure, the force of gravity refers to a vector that indicates the direction of the pull of gravity on an object at or near the surface of the earth.

Fork: As used in this disclosure, a fork is a handle on which two or more spits are attached. The fork is used to move a foodstuff.

Form Factor: As used in this disclosure, the term form factor refers to the size and shape of an object.

Friction: As used in this disclosure, friction refers to a force that occurs between two objects that are in motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Jib: As used in this disclosure, a jib is a beam structure that: 1) is mounted with a free end in the manner of a cantilever; and, 2) suspends a load at the free end of the jib. In multicomponent beam structures, such as with a crane, the jib is the sub-structure that physically suspends the load.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Non-Euclidean Prism: As used in this disclosure, a non-Euclidean prism is a prism structure wherein the center axis of the prism lies on a non-Euclidean plane or is otherwise formed with a curvature.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan. A semi-enclosed pan refers to a pan wherein the closed end of prism structure of the pan and/or a portion of the lateral face of the pan is also open.

Pedestal: As used in this disclosure, a pedestal is an intermediary load bearing structure that that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Reduction-Oxidation Reaction: As used in this disclosure, a reduction-oxidation reaction (also known as a redox reaction) is a chemical reaction involving the transfer of electrons between the reactants of the reaction.

Relaxed Shape: As used in this disclosure, a structure is considered to be in its relaxed state when no shear, strain, or torsional forces are being applied to the structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Spit: As used in this disclosure, a spit is a sharpened prism-shaped structure that inserts through a foodstuff in preparation for a cooking process. The spit is often used to suspend the foodstuff above a heat source. Skewer is a synonym for spit. To skewer is a verb used to describe the insertion of a spit into the foodstuff.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A fire pit cooking apparatus comprising
a pedestal, a telescopic stanchion, and a jib structure;
wherein the telescopic stanchion attaches the jib structure to the pedestal;
wherein the fire pit cooking apparatus is configured for use with a foodstuff;
wherein the fire pit cooking apparatus is configured for use with a fire;
wherein the fire pit cooking apparatus suspends the foodstuff above the fire;
wherein the fire pit cooking apparatus is adjustable such that the position of the foodstuff relative to the fire is adjustable;
wherein the jib structure comprises a jib clip and a plurality of jibs;
wherein the jib clip comprises a first jib mount, a second jib mount, and a cantilever v spring;
wherein the first jib mount attaches to the cantilever v spring;
wherein the second jib mount attaches to the cantilever v spring;
wherein the cantilever v spring acts as a spring.

2. The fire pit cooking apparatus according to claim 1
wherein the telescopic stanchion forms a load path that transfers the load of the jib structure to the pedestal;
wherein the jib structure suspends the foodstuff above the fire;
wherein the jib structure attaches to the telescopic stanchion such that the elevation of the jib above the supporting surface is adjustable.

3. The fire pit cooking apparatus according to claim 2
wherein the pedestal is a prism-shaped structure;
wherein the pedestal is a pointed stake for insertion into a supporting structure;
wherein the pedestal forms the inferior structure of the fire pit cooking apparatus;
wherein the pedestal forms the final link in the load path that transfers the load of the fire pit cooking apparatus to the supporting surface.

4. The fire pit cooking apparatus according to claim 3
wherein the telescopic stanchion is a vertically oriented structure;
wherein the telescopic stanchion is a telescopic structure such that the span of the length of the center axis of the composite prism structure of the telescopic stanchion is adjustable;
wherein the telescopic stanchion attaches to the superior surface of the pedestal;
wherein the telescopic stanchion attaches to the pedestal such that the center axis of the composite prism structure of the telescopic stanchion projects perpendicularly away from the superior surface of the pedestal.

5. The fire pit cooking apparatus according to claim 4
wherein the jib structure is a mechanical structure;
wherein the jib structure suspends the foodstuff over the fire;
wherein the jib structure forms the structure that attaches the foodstuff to the telescopic stanchion of the fire pit cooking apparatus;
wherein the jib structure attaches to the telescopic stanchion such that the elevation of the jib structure above the supporting surface is adjustable;
wherein the adjustment of the elevation of the jib structure adjusts the position of the foodstuff relative to the fire.

6. The fire pit cooking apparatus according to claim 5
wherein the telescopic stanchion comprises a first stanchion arm, a second stanchion arm, and a detent;
wherein the detent is a mechanical structure that locks and secures the first stanchion arm to the second stanchion arm;
wherein the first stanchion arm is a hollow first prism-shaped structure that is further defined with an inner dimension;
wherein the second stanchion arm is a second prism-shaped structure that is further defined with an outer dimension;
wherein the first stanchion arm and the second stanchion arm are geometrically similar.

7. The fire pit cooking apparatus according to claim 6
wherein the span of the outer dimension of the second stanchion arm is less than the span of the inner dimension of the first stanchion arm such that the second stanchion arm inserts into the first stanchion arm in a telescopic manner to form a composite prism structure;
wherein the span of the length of the telescopic stanchion adjusts by adjusting the relative position of the second stanchion arm within the first stanchion arm;
wherein the position of the second stanchion arm relative to the first stanchion arm is held in position using the detent.

8. The fire pit cooking apparatus according to claim 7
wherein the jib clip attaches each of the plurality of jibs attaches to the second stanchion arm in the manner of a cantilever;
wherein each of the plurality of jibs suspends a foodstuff above the fire;
wherein each foodstuff is suspended from the free end of the cantilever structure of a jib selected from the plurality of jibs.

9. The fire pit cooking apparatus according to claim 8
wherein the jib clip is a mechanical structure;
wherein the jib clip is a spring-loaded structure;
wherein the jib clip attaches to the second stanchion arm of the telescopic stanchion such that the position of the jib clip along the center axis of the second stanchion arm is adjustable.

10. The fire pit cooking apparatus according to claim 9
wherein each of the plurality of jibs is a jib;
wherein each of the plurality of jibs attaches to the second stanchion arm of the telescopic stanchion in the manner of a cantilever;
wherein each of the plurality of jibs suspends a foodstuff above the fire;
wherein each foodstuff is suspended from the free end of the cantilever structure of a jib selected from the plurality of jibs.

11. The fire pit cooking apparatus according to claim 10
wherein the plurality of jibs comprises a first jib and a second jib;
wherein the first jib is a prism-shaped structure;
wherein the first jib attaches to the jib structure such that the first jib projects away from the telescopic stanchion in the manner of a cantilever;

wherein the first jib suspends a foodstuff over the fire;
wherein the second jib is a prism-shaped structure;
wherein the second jib attaches to the jib structure such that the second jib projects away from the telescopic stanchion in the manner of a cantilever;
wherein the second jib suspends a foodstuff over the fire.

12. The fire pit cooking apparatus according to claim 11 wherein the cantilever v spring further comprises a first spring arm and a second spring arm;
wherein the first spring arm forms a first elastomeric element of the cantilever v spring;
wherein the second spring arm forms a second elastomeric element of the cantilever v spring;
wherein the first spring arm is formed as a semi-rigid structure with an elastic nature;
wherein the second spring arm is formed as a semi-rigid structure with an elastic nature.

13. The fire pit cooking apparatus according to claim 12 wherein the first jib mount is a mechanical structure;
wherein the first jib attaches to the first jib mount of the jib structure such that the first jib extends over the fire in the manner of a cantilever;
wherein the second jib mount is a mechanical structure;
wherein the second jib attaches to the second jib mount of the jib structure such that the second jib extends over the fire in the manner of a cantilever.

14. The fire pit cooking apparatus according to claim 13 wherein the first spring arm further comprises a first stanchion aperture;
wherein the second spring arm further comprises a second stanchion aperture;
wherein the first stanchion aperture is a disk-shaped negative space that is formed through the congruent ends of the first spring arm;
wherein the second stanchion aperture is a disk-shaped negative space that is formed through the congruent ends of the second spring arm;
wherein the first stanchion aperture is sized such that the second stanchion arm of the telescopic stanchion will insert through the first stanchion aperture;
wherein the second stanchion aperture is sized such that the second stanchion arm of the telescopic stanchion will insert through the second stanchion aperture.

15. The fire pit cooking apparatus according to claim 14 wherein the position of the second stanchion aperture on the second spring arm relative to the position of the second stanchion aperture on the first spring arm is such that the first spring arm and the second spring arm must be deformed in order to align the center axis of the second stanchion aperture with the center axis of the first stanchion aperture;
wherein the first stanchion aperture and the second stanchion aperture press against the lateral face of the prism structure of the second stanchion arm when the center axes of the first stanchion aperture, the second stanchion aperture, and the second stanchion arm are out of alignment.

16. The fire pit cooking apparatus according to claim 15 wherein the first jib further comprises a first jib shaft, a first jib handle, and a pan mount;
wherein the first jib shaft is a prism-shaped structure;
wherein the first jib shaft forms an extension structure that creates a reach that separates the pedestal and the telescopic stanchion from the fire;
wherein the first jib handle is a grip that attaches to the fixed end of the cantilever structure of the first jib shaft;
wherein the first jib handle allows for the manipulation of the first jib shaft as it attaches to and is removed from the first jib mount;
wherein the pan mount is a mechanical structure used to attach a cooking pan to the free end of the first jib shaft.

17. The fire pit cooking apparatus according to claim 16 wherein the second jib further comprises a second jib shaft, a second jib handle, and a fork structure;
wherein the second jib shaft is a prism-shaped structure;
wherein the second jib shaft forms an extension structure that creates a reach that separates the pedestal and the telescopic stanchion from the fire;
wherein the second jib handle is a grip that attaches to the fixed end of the cantilever structure of the second jib shaft;
wherein the second jib handle allows for the manipulation of the second jib shaft as it attaches to and is removed from the second jib mount;
wherein the fork structure is a fork formed on the free end of the second jib shaft that is used to skewer a foodstuff before cooking.

18. The fire pit cooking apparatus according to claim 17 wherein the second stanchion arm further comprises a stanchion grip;
wherein the stanchion grip is a 90 degree bend that is formed in the end of the second stanchion arm of the telescopic stanchion that is distal from the first stanchion arm of the telescopic stanchion.

19. The fire pit cooking apparatus according to claim 18 wherein the pedestal is formed with a high density material such that the fire pit cooking apparatus will maintain a low center of mass relative to the supporting surface during the use of the fire pit cooking apparatus;
wherein by high density is meant that the pedestal has a density of greater than 7.5 grams per cubic centimeter.

* * * * *